(12) United States Patent
Cueppers et al.

(10) Patent No.: US 9,909,662 B2
(45) Date of Patent: *Mar. 6, 2018

(54) METHOD AND CONTROL DEVICE FOR OPERATING AN AUTOMATIC TRANSMISSION

(71) Applicant: ZF Friedrichshafen AG, Friedrichshafen (DE)

(72) Inventors: Ruben Cueppers, Wangen (DE); Georg Mihatsch, Lindau (DE); Andreas Schmidt, Bavendorf (DE); Max Trautwein, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 53 days.

This patent is subject to a terminal disclaimer.

(21) Appl. No.: 14/965,189

(22) Filed: Dec. 10, 2015

(65) Prior Publication Data
US 2016/0169379 A1    Jun. 16, 2016

(30) Foreign Application Priority Data
Dec. 10, 2014  (DE) .................... 10 2014 225 455

(51) Int. Cl.
*F16H 61/04* (2006.01)

(52) U.S. Cl.
CPC ... *F16H 61/0403* (2013.01); *F16H 2061/047* (2013.01); *F16H 2061/0474* (2013.01)

(58) Field of Classification Search
CPC ................ F16H 61/0403; F16H 2061/047
See application file for complete search history.

(56) References Cited

U.S. PATENT DOCUMENTS

| 5,261,288 A * | 11/1993 | Menig | F16H 61/0248 74/335 |
| 8,496,562 B2 | 7/2013 | Arnold et al. | |
| 2016/0169378 A1 * | 6/2016 | Cueppers | F16H 61/0403 192/3.51 |

FOREIGN PATENT DOCUMENTS

| DE | 102009000253 A1 | 7/2010 |
| DE | 102011017741 A1 | 10/2012 |

OTHER PUBLICATIONS

German Search Report DE102014225455.8, dated Sep. 23, 2015. (8 pages).

* cited by examiner

*Primary Examiner* — Sherry L Estremsky
(74) *Attorney, Agent, or Firm* — Dority & Manning, P.A.

(57) ABSTRACT

A method for operating an automatic transmission includes shifting the automatic transmission to a substitute gear if, after adjusting a first one of at least one positive-locking shift element towards a closed configuration, the first one of the at least one positive-locking shift element occupies an intermediate position. The first one of the at least one positive-locking shift element does not participate in the transmission of power in the substitute gear. A related transmission control device for an automatic transmission is also provided.

10 Claims, 2 Drawing Sheets

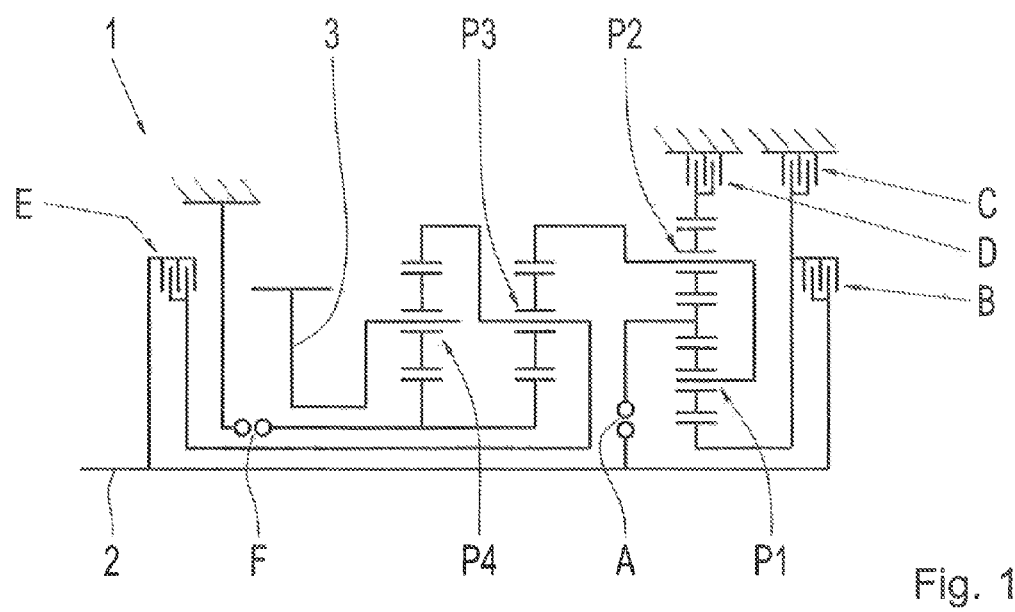

METHOD AND CONTROL DEVICE FOR OPERATING AN AUTOMATIC TRANSMISSION

FIELD OF INVENTION

The invention relates generally to a method for operating an automatic transmission. Furthermore, the invention relates generally to a transmission control device of an automatic transmission.

BACKGROUND

A method for operating an automatic transmission is known from DE 10 2009 000 253 A1. Thus, under this state of the art, for engaging a target gear in the automatic transmission, a positive-locking shifting element that is open in the actual operating state and locked in the target gear of the automatic transmission is at least approximately synchronized by increasing the transmission capacity of a frictional-locking shifting element, whereas the frictional-locking shifting element used for the synchronization of the positive-locking shifting element is not locked either in the actual operating state or in the target gear of the automatic transmission. When a defined operating state of the automatic transmission is reached, the positive-locking shifting element that is at least approximately synchronized with the assistance of the frictional-locking shifting element is driven to lock.

Upon the locking of a positive-locking shifting element, the situation may arise that the positive-locking shifting element cannot be locked, but occupies an intermediate position, such as a tooth-on-tooth position or a clamp position. If it is then recognized that, after driving the positive-locking shifting element, it is not locked, but occupies an intermediate position, in the method known from practice, measures are taken to release the intermediate position. This causes delays in the buildup of traction, which limits vehicle availability, for example upon start-up. This is disadvantageous.

As such, there is a need to increase vehicle availability, particularly upon the detection of an intermediate position for a positive-locking shifting element to be locked.

SUMMARY OF THE INVENTION

The present invention is directed to a method for operating an automatic transmission and a transmission control device for carrying out the method. Additional objectives and advantages of the invention set will be set forth in part in the following description, or may be obvious from the description, or may be learned through practice of the invention.

In accordance with an exemplary embodiment of the invention, if it is detected that, after the driving of the positive-locking shifting element, the same is not locked, but occupies an intermediate position, the automatic transmission shifts to a substitute gear, in which the positive-locking shifting element does not participate in the transmission of power. By shifting to the substitute gear, vehicle availability can be increased.

Preferably, it is shifted to a substitute gear, in which the frictional-locking shifting element used for synchronizing the positive-locking shifting element is locked. This serves to further increase vehicle availability, thus the buildup of traction may be as free of delay as possible.

If it is detected that, after the driving of the positive-locking shifting element, the same occupies an intermediate position, no measures are taken to release the intermediate position, but there is an immediate shift to the substitute gear. Thereby, vehicle availability can be increased, and the time required for the buildup of traction can be reduced.

According to a further additional exemplary form of the present subject matter, prior to increasing the transmission capacity of the frictional-locking shifting element that is used for synchronizing the positive-locking shifting element, an additional frictional-locking shifting element is locked, which is locked in the target gear of the automatic transmission and is open in the substitute gear of the automatic transmission. If it is then detected that the positive-locking shifting element occupies an intermediate position, for engaging the substitute gear, the frictional-locking shifting element that is used for synchronizing the positive-locking shifting element is completely locked and the other frictional-locking shifting element that is already locked, which is locked in the target gear of the automatic transmission and is open in the substitute gear of the automatic transmission, is completely open. Thereby, vehicle availability can be increased.

BRIEF DESCRIPTION OF THE DRAWINGS

Exemplary embodiments of the invention are, without any limitation, more specifically described by means of the drawings.

Thereby, the following is shown:

FIG. 1 provides a transmission diagram of an automatic transmission according to an exemplary embodiment of the present subject matter;

FIG. 2 provides an exemplary shifting matrix for the exemplary automatic transmission of FIG. 1;

DETAILED DESCRIPTION

Figure 3:
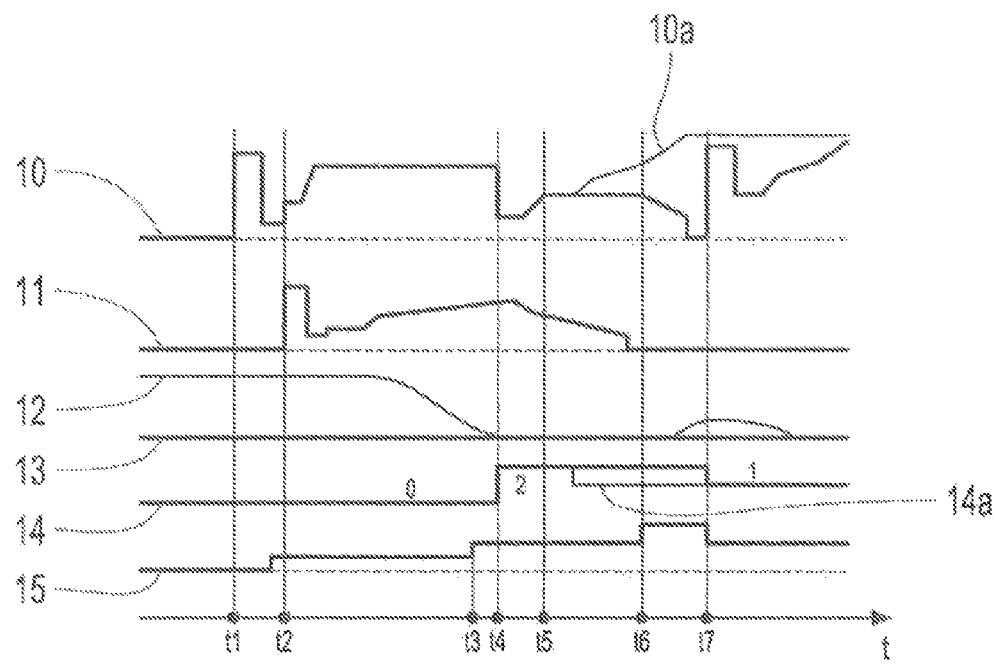
FIG. 3 provides chronological curve progressions for the clarification of a method, known from the state of the art, for operating an automatic transmission.

Reference will now be made to embodiments of the invention, one of more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Exemplary aspects of the invention relate to a method and a control device for operating an automatic transmission, namely those details that, upon the detecting of an intermediate position at the positive-locking shifting element of the automatic transmission to be locked, reduce delays in the buildup of traction in the automatic transmission, and thereby increase vehicle availability.

FIG. 1 shows an exemplary diagram of an automatic transmission 1 with a transmission input shaft 2 and a transmission output shaft 3, whereas several planetary gear sets P1, P2, P3 and P4 are shifted between the transmission input shaft 2 and the transmission output shaft 3. In addition, the automatic transmission 1 has several shifting elements A, B, C, D, E and F, whereas the shifting elements A and F are positive-locking shifting elements and the shifting elements C, D, B and E are frictional-locking shifting elements. In the embodiment shown, the positive-locking shifting elements A and F are designed as claw shifting elements, the frictional-locking shifting elements C and D are designed as brakes and the frictional-locking shifting elements B and E are designed as clutches.

In each gear of the automatic transmission, a first group of shifting elements are locked and a second group of shifting elements are open. Thus, it can be seen from FIG. 2 that, in each regular gear of the automatic transmission 1, i.e., in the forward gears 1 to 9 and in the reverse gear R, three shifting elements are open and three shifting elements are locked. In the exemplary shifting matrix of FIG. 2, the shifting elements locked in the respective gear are indicated by a dot.

If the automatic transmission 1 is in neutral N, that is, if no traction in the automatic transmission 1 is built up, only two shifting elements, i.e. the frictional-locking shifting elements D and the positive-locking shifting elements F, are locked.

It is to be subsequently assumed that the automatic transmission 1 is to be transferred from an actual operating state in which no gear is engaged, i.e. starting from neutral N to a target operating state, in which one target gear is engaged, i.e. a starting gear, for example the forward gear 1. FIG. 3 shows the approach known from the state of the art for the engaging of the target gear, starting from the actual operating state of the automatic transmission 1, whereas FIG. 3 shows several chronological curve progressions over the time t, i.e. with the chronological curve progression 10, a control pressure for the frictional-locking shifting element D, with the curve progression 11, a control pressure for the frictional-locking shifting elements E, with the curve progression 12, a chronological progression of the transmission input rotational speed for the transmission input shaft 2, with the curve progression 13, a chronological progression of the transmission output rotational speed for the transmission output shaft 3, with the curve progression 14, the state or the position of the positive-locking shifting element A to be locked and, with the curve progression 15, a control pressure for the positive-locking shifting element A to be locked.

At the point in time t1, on the control side, the engagement of the starting gear, i.e. the forward gear 1, is requested, whereas, at the point in time t1, the automatic transmission 1 is initially transferred into neutral N by the frictional-locking shifting element D initially being locked. The control or position of the positive-locking shifting element F is not visualized in FIG. 3; however, it is assumed that the same is locked at any time after the point in time t1.

As can be seen from exemplary shifting matrix of FIG. 2, for the transfer of the automatic transmission 1 from the actual operating state of neutral N, in which the shifting elements D and F are locked, to the target gear, i.e. to the forward gear 1, the positive-locking shifting element A is also locked, whereas, for this purpose, subsequent to the locking of the frictional-locking shifting element D, the frictional-locking shifting element E is driven, beginning at the point in time t2, to lock in accordance with the curve progression 11, whereas, with the assistance of this frictional-locking shifting element E, the positive-locking shifting element A to be locked is synchronized. The frictional-locking shifting element E used for synchronizing the positive-locking shifting element A is not locked either in the actual operating state of the automatic transmission 1 or in neutral N, or in the target gear of the automatic transmission 1 that is be engaged.

In FIG. 3, it is assumed that the positive-locking shifting element A to be locked has been sufficiently synchronized, such that, at the point in time t3, the control pressure for the positive-locking shifting element A is increased. The actual driving of the positive-locking shifting element A for the locking of the same takes place after the increase to the control pressure at the point in time t4.

At the point in time t4, in accordance with the curve progression 14, the positive-locking shifting element A to be locked is transferred, starting from its open position, which is marked with state 0, in the direction of a locked position, whereas, however, it is detected at the point in time t5 that the positive-locking shifting element A to be locked could not be completely locked; rather, it occupies an intermediate position, which is marked with the state 2.

If it is detected that, at the point in time t5, the positive-locking shifting element A occupies an intermediate position and therefore has not been completely locked, in the state of the art, beginning at the point in time t5, measures are subsequently taken to release the intermediate position at the positive-locking shifting element, i.e., between the points in time t5 and t6, measures for the release of a so-called "tooth-on-tooth position" and then, if such measures are not successful, between the points in time t6 and t7, measures for the release of a clamp on the positive-locking shifting element A.

This takes place in accordance with the curve progressions 10 and 11 through a defined change to the control pressure for the frictional-locking shifting elements D and E.

The curve progressions 10a, 14a of FIG. 3 arise if the measures to release the tooth-on-tooth position between the points in time t5 and t6 have been successful.

In FIG. 3 it is assumed that, no later than the point in time t7, the intermediate position at the positive-locking shifting element A has been released, such that the same then occupies its locked position, which is marked in FIG. 3 by the state 1.

The measures taken under the state of the art between the points in time t5 and t6, along with the points in time t6 and t7, for the elimination or release of the intermediate position at the positive-locking shifting element A to be locked require time, which delays the buildup of traction in the automatic transmission 1 and therefore limits the availability of the motor vehicle.

Details of the method in accordance with exemplary aspects of the invention, with the assistance of which the buildup of traction in the transmission 1 upon the detection of an intermediate position at the shifting element A to be locked is shortened, and thus vehicle availability can be increased, are described below with reference to FIG. 4, whereas, in FIG. 4, over time t, several chronological curve progressions are in turn shown, i.e. with the curve progression 10', the control pressure of the frictional-locking shifting element D, with the curve progression 11', the control pressure of the frictional-locking shifting element E, with the curve progression 12', the transmission input rotational speed at the transmission input shaft 2, with the curve progression 13', the transmission output rotational speed at the transmission output shaft 3, with the curve progression 14', the shifting status or the position of the positive-locking shifting element A and, with the curve progression 15', the control pressure for the positive-locking shifting element A to be locked.

Figure 4:
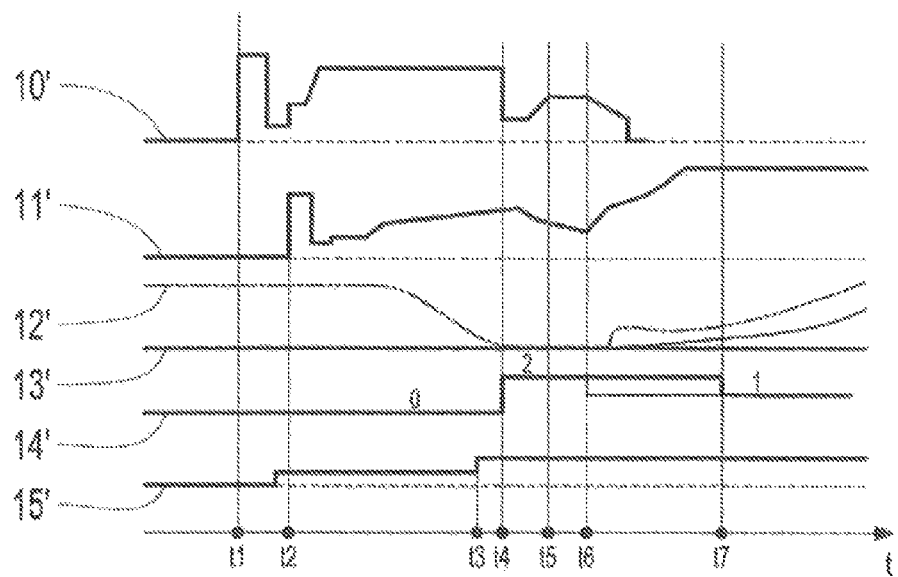
FIG. 4 provides chronological curve progressions for the clarification of the method in accordance with an exemplary embodiment of the invention for operating an automatic transmission.

Between the points in time t1 and t5, the curve progressions 10' to 15' of FIG. 4 correspond to the curve progressions 10 to 15 of FIG. 3, which is why, for the avoidance of unnecessary repetition, reference is made to the statements above.

Accordingly, for at least the approximate synchronization of the positive-locking shifting element A to be locked, beginning at the point in time t2, the frictional-locking shifting element E, which is not locked either in the actual operating state of neutral N of the automatic transmission 1 or in the target gear of the same, is correspondingly driven to increase the transmission capacity of the same.

Moreover, it is determined in FIG. 4 that, between the points in time t4 and t5, the positive-locking shifting element A to be locked could not be locked; rather, the same occupies an intermediate position at the point in time t5. This can be detected, for example, by an end limit sensor or a displacement sensor that works together with the positive-locking shifting element A.

In accordance with exemplary aspects of the invention, if an intermediate position at the shifting element A is present at the point in time t5, beginning at the point in time t5, the automatic transmission is shifted to a substitute gear, in which the positive-locking shifting element A to be locked in and of itself does not participate in the transmission of power.

Accordingly, in accordance with exemplary aspects of the invention, after the detection of an intermediate position at the positive-locking shifting element A to be locked, no measures are taken through driving the frictional-locking shifting elements to release the intermediate position of the positive-locking shifting element A; rather, the automatic transmission 1 is immediately transferred or shifted to the substitute gear, in which the positive-locking shifting element A does not participate in the transmission of power.

Preferably, in the substitute gear, the frictional-locking shifting element E used for synchronizing the positive-locking shifting element A, which is not locked either in the actual operating state or in the target gear of the automatic transmission, is locked.

For the automatic transmission 1 shown in FIG. 1, for this purpose, beginning at the point in time t5, in accordance with the curve progression 11', the frictional-locking shifting element E is locked and the frictional-locking shifting element D is open, such that, in the substitute gear, the positive-locking shifting element F and the frictional-locking shifting element E are then locked.

If, with the automatic transmission of FIG. 1, the two shifting elements E and F are locked, traction may also be provided with the open positive-locking shifting element A. Accordingly, in the substitute gear, the positive-locking shifting element A does not participate in the transmission of power. Accordingly, a modified forward gear 4 serves as the substitute gear, in which the shifting elements E and F are locked, and in which the shifting element A is open.

In this substitute gear, forces and torques can be transferred, such that his substitute gear can be used as the starting gear, in order to increase vehicle availability. Accordingly, beginning at the point in time t8 of FIG. 4, forces and torques can be transferred from the automatic transmission 1, i.e. by using the modified forward gear 4 as the substitute gear.

In the regular forward gear 4, the shifting element A is locked, in order to allow an upshift and downshift starting from the forward gear 4.

In FIG. 4, it is assumed that, no later than the point in time t9, the positive-locking shifting element A in accordance with the curve progression 14' is engaged and is accordingly completely locked, that the same occupies the state 1 at the point in time t9.

Accordingly, in exemplary aspects of the present invention, upon the transfer of an automatic transmission 1 from an actual operating state to a target gear, a positive-locking shifting element A is to be synchronized, through a frictional-locking shifting element E, which is not locked either in the actual operating state or in the target gear. If, despite the synchronization, the positive-locking shifting element A cannot be locked, but is only transferred to an intermediate position, in accordance with exemplary aspects of the invention, no measures to release the intermediate position at the positive-locking shifting element A are taken, rather, it is immediately shifted to a substitute gear, in which the positive-locking shifting element A does not participate in the transmission of power and in which, preferably, the frictional-locking shifting element E used for synchronizing the positive-locking shifting element is locked. An additional frictional-locking shifting element D, which is locked in the target gear of the automatic transmission and was locked in front of the frictional-locking shifting element E used for synchronization, is open for the engagement of the substitute gear.

The invention further relates to a transmission control device for carrying out the method in accordance with exemplary aspects of the invention. The transmission control device controls the modules that participate in the carrying out of the method in accordance with exemplary aspects of the invention and has data interfaces for this purpose. Further, the transmission control device has a data memory for storing data and a processor for data processing. In addition to such hardware tools of the transmission control device, program modules for carrying out the method in accordance with exemplary aspects of the invention are implemented in the same as software tools.

Modifications and variations can be made to the embodiments illustrated or described herein without departing from the scope and spirit of the invention as set forth in the appended claims.

REFERENCE SIGNS

1 Automatic transmission
2 Transmission input shaft
3 Transmission output shaft
10, 10' Control of the frictional-locking shifting element
11, 11' Control of the frictional-locking shifting element
12, 12' Transmission input rotational speed
13, 13' Transmission output rotational speed
14, 14' Position of the positive-locking shifting element
15, 15' Control pressure of the positive-locking shifting element
A Positive-locking shifting element
B Frictional-locking shifting element
C Frictional-locking shifting element
D Frictional-locking shifting element
E Frictional-locking shifting element
F Positive-locking shifting element
P1 Planetary gear set
P2 Planetary gear set
P3 Planetary gear set
P4 Planetary gear set

The invention claimed is:

1. A method for operating an automatic transmission having a plurality of friction-locking shift elements and at least one positive-locking shift element, comprising:

initiating a shift of the automatic transmission from an initial gear to a subsequent gear, a first one of the plurality of friction-locking shift elements being open in the initial gear and the subsequent gear of the automatic transmission, a first one of the at least one positive-locking shift element being open in the initial gear and closed in the subsequent gear of the automatic transmission;

increasing a transmission capacity of the first one of the plurality of friction-locking shift elements during the shift of the automatic transmission from the initial gear to the subsequent gear such that the first one of the at least one positive-locking shift element synchronizes;

adjusting the first one of the at least one positive-locking shift element towards a closed configuration after synchronizing the first one of the at least one positive-locking shift element with the first one of the plurality of friction-locking shift elements; and shifting the automatic transmission to a substitute gear when, after adjusting the first one of the at least one positive-locking shift element towards the closed configuration, the first one of the at least one positive-locking shift element does not fully adjust to the closed configuration but occupies an intermediate position, wherein the first one of the at least one positive-locking shift element does not participate in the transmission of power between an input shaft and an output shaft of the automatic transmission in the substitute gear.

2. The method of claim 1, wherein the first one of the plurality of friction-locking shift elements is locked when the automatic transmission shifts to the substitute gear.

3. The method of claim 1, wherein no measures are taken to release the intermediate position of the first one of the at least one positive-locking shift element when the automatic transmission shifts to the substitute gear.

4. The method of claim 1, wherein a second one of the plurality of friction-locking shift elements is locked prior to increasing the transmission capacity of the first one of the plurality of friction-locking shift elements, the second one of the plurality of friction-locking shift elements being closed in the subsequent gear of the automatic transmission and open in the substitute gear.

5. The method of claim 4, further comprising opening the second one of the plurality of friction-locking shift elements and closing the first one of the plurality of friction-locking shift elements when, after adjusting the first one of the at least one positive-locking shift element towards the closed configuration, the first one of the at least one positive-locking shift element occupies the intermediate position.

6. A transmission control device for an automatic transmission having a plurality of frictional-locking shift elements and at least one positive-locking shift element, the transmission control device comprising a processor; and a memory storing computer-executable instructions that, when executed by the processor, cause the processor to perform operations comprising increasing a pressure control signal to a first one of the plurality of friction-locking shift elements during a shift of the automatic transmission from an initial gear to a subsequent gear such that a first one of the at least one positive-locking shift element synchronizes, the first one of the plurality of friction-locking shift elements being open in the initial gear and the subsequent gear of the automatic transmission, the first one of the at least one positive-locking shift element being open in the initial gear and closed in the subsequent gear of the automatic transmission;

commanding the first one of the at least one positive-locking shift element to adjust towards a closed configuration by increasing a pressure control signal to the first one of the at least one positive-locking shift element after synchronizing the first one of the at least one positive-locking shift element with the first one of the plurality of friction-locking shift elements;

shifting the automatic transmission to a substitute gear when the first one of the at least one positive-locking shift element does not fully adjust to the closed configuration but occupies an intermediate position after the first one of the at least one positive-locking shift element is commanded towards the closed configuration, wherein the first one of the at least one positive-locking shift element does not participate in the transmission of power between an input shaft and an output shaft of the automatic transmission in the substitute gear.

7. The transmission control device of claim 6, wherein the pressure control signal to the first one of the plurality of friction-locking shift elements is increased when the automatic transmission shifts to the substitute gear such that the first one of the plurality of friction-locking shift elements locks.

8. The transmission control device of claim 6, wherein the transmission control device takes no measures to release the intermediate position of the first one of the at least one positive-locking shift element when the automatic transmission shifts to the substitute gear.

9. The transmission control device of claim 6, wherein the computer-executable instructions further comprise increasing a pressure control signal to a second one of the plurality of friction-locking shift elements prior to increasing the transmission capacity of the first one of the plurality of friction-locking shift elements such that the second one of the plurality of friction-locking shift elements locks, wherein the second one of the plurality of friction-locking shift elements is closed in the subsequent gear of the automatic transmission and open in the substitute gear.

10. The transmission control device of claim 9, wherein the computer-executable instructions further comprise decreasing the pressure control signal to the second one of the plurality of friction-locking shift elements and increasing the pressure control signal to the first one of the plurality of friction-locking shift elements such that the second one of the plurality of friction-locking shift elements opens and the first one of the plurality of friction-locking shift elements closes when the first one of the at least one positive-locking shift element occupies the intermediate position.

* * * * *